US006629179B1

(12) United States Patent
Bashford

(10) Patent No.: US 6,629,179 B1
(45) Date of Patent: Sep. 30, 2003

(54) MESSAGE SIGNALED INTERRUPT GENERATING DEVICE AND METHOD

(75) Inventor: Patrick R. Bashford, Fort Collins, CO (US)

(73) Assignee: Adaptec, Inc., Milpitas, CA (US)

( * ) Notice: Subject to any disclaimer, the term of this patent is extended or adjusted under 35 U.S.C. 154(b) by 409 days.

(21) Appl. No.: 09/630,341

(22) Filed: Jul. 31, 2000

(51) Int. Cl.[7] .............................................. G06F 13/24
(52) U.S. Cl. ........................ 710/260; 710/112; 710/306
(58) Field of Search .......................... 710/36, 306, 305, 710/260–266, 311, 314, 312, 310

(56) References Cited

U.S. PATENT DOCUMENTS

| 5,692,200 | A | * | 11/1997 | Carlson et al. | 710/262 |
|---|---|---|---|---|---|
| 6,253,275 | B1 | * | 6/2001 | Waldron et al. | 710/260 |
| 6,370,607 | B1 | * | 4/2002 | Williams et al. | 710/262 |
| 6,389,526 | B1 | * | 5/2002 | Keller et al. | 712/30 |

OTHER PUBLICATIONS

Unknown, "*PCI Local Bus Specification Revision 2.2,*" Dec. 18, 1998, PCI Special Interest Group, 322 pages.

* cited by examiner

Primary Examiner—Rupal Dharia
Assistant Examiner—Kim T. Huynh

(74) *Attorney, Agent, or Firm*—Martine & Penilla, LLP

(57) ABSTRACT

The present invention provides a bridge device and a method for generating message signaled interrupts to indicate completion of write transactions from one or more secondary bus devices to a primary bus device. The bridge device is coupled between a first bus and a second bus. The one or more secondary bus devices are coupled to the second bus and the primary bus device is coupled to the first bus. The bridge device includes a bridge FIFO and control circuitry, a first register, and an interrupt generation logic. The bridge FIFO and control circuitry is arranged to control data transfer between the one or more secondary bus devices and the primary bus device. The bridge FIFO and control circuitry is further configured to store and transfer write data from the one or more secondary bus devices to the primary bus device. The first register is arranged to store a set of interrupt bit numbers. Each of the one or more secondary bus devices is configured to write an interrupt bit number into the first register after completion of a write data transfer to the bridge FIFO and control circuitry to indicate completion of the write data transfer. The interrupt generation logic is coupled to the bridge FIFO and control circuitry and the first register, and is arranged to generate message signaled interrupts in response to the writing of the interrupt bit numbers. In this configuration, the interrupt generation logic generates the message signaled interrupts in the order the write data transfers are posted to the first bus. In addition, each of the message signaled interrupts is generated and posted after all write data transfers associated with the interrupt bit number have been posted to the first bus.

29 Claims, 10 Drawing Sheets

MESSAGE SIGNALED INTERRUPT GENERATING DEVICE AND METHOD

BACKGROUND OF THE INVENTION

1. Field of the Invention

This invention relates generally to intelligent bus subsystems, and more particularly to intelligent PCI bus subsystems that use message signaled interrupts.

2. Description of the Related Art

Modern computer systems typically employ buses to convey information between various parts in the computer systems. For example, computer systems generally include one or more buses to connect a central processing unit (CPU) to a main memory and input/output (I/O) devices for transferring data and control signals. Today, one of the most widely used buses is peripheral component interface (PCI) bus.

With the proliferation of I/O devices such as disk drives, tape drives, printers, scanners, and audio/video devices, the PCI bus is used to connect an increasing number of I/O devices. To accommodate the addition of more I/O devices, conventional computer systems typically provide one or more secondary PCI buses in addition to a primary PCI bus. In intelligent PCI subsystems, a transparent or non-transparent bridge may be used. An intelligent PCI subsystem typically has a CPU on the secondary side and uses a non-transparent bridge to allow more control over device addressing. In such cases, the I/O devices coupled to a secondary PCI are typically not "visible" from the primary PCI bus. For communicating with devices on the primary PCI bus, each secondary PCI bus typically is coupled to the primary PCI bus through a PCI application bridge, which is often referred to as a non-transparent or opaque PCI bridge. A PCI application bridge and devices attached to the PCI bridge form a PCI subsystem.

Conventional bus subsystems such as PCI subsystems typically communicate with a host computer system on the primary PCI bus using an interrupt scheme to control the flow of instruction execution of a host processor. In this scheme, secondary PCI devices attached to a secondary PCI bus communicates an interrupt signal to change the control flow of the host processor. For example, when a secondary PCI device sends data to the host computer system, the secondary PCI device sends an interrupt signal to the host computer system to indicate the completion of data transfer. By using the interrupt scheme, the host processor in the host computer can attend to other tasks while the data is being received. When the interrupt signal from the secondary PCI device is received, the host processor can now process the information received from the device.

Recently, an enhancement to the conventional PCI protocol has been specified. The latest enhancement is specified as an addendum to PCI local bus specification version 2.2 and is commonly known as PCI-X specification. Among other features, PCI specification version 2.2 and the PCI-X specification provide message signaled interrupts (optional for PCI specification version 2.2) to facilitate interrupt processing instead of using interrupt signals. The message signaled interrupts (MSI) are essentially write transactions that enable a device to request service by writing a system-specified message to a system-specified address. In these write transactions, the transaction address specifies the message destination while the transaction data specifies the message. The PCI local bus specification version 2.2 and PCI-X specification are incorporated herein by reference.

In a PCI or PCI-X subsystem, message signaled interrupts are generated as memory writes by individual devices attached to the PCI bus and are forwarded across one or more PCI bridges to a controller associated with the host CPU. Because these write transactions are sent over a PCI bridge as normal memory write transactions, they push through any previously posted write transactions. Since previously posted write transactions are pushed through, the transactions automatically adhere to the PCI transaction ordering rules.

Often, however, a message signaled interrupt that is internally generated by the bridge should not be written until any posted writes that were pending when the interrupt occurred have completed. For example, a secondary PCI agent attached to a secondary PCI bus may be writing data to a primary PCI agent coupled to a primary PCI bus via a PCI bridge. After writing the data, the secondary PCI agent will write a register internal to the bridge, thereby causing the bridge to generate an interrupt message notifying the CPU on the primary PCI bus that the data is available. When the data is posted in the bridge, the write operation has completed from the secondary PCI agent's perspective. Hence, the secondary PCI agent is free to write the register in the PCI bridge to generate the interrupt message to the CPU. In such cases, however, the interrupt message may not reach the CPU prior to the data reaching the primary PCI agent. This may cause error conditions or require the subsystem to provide other ways to guarantee that the write is complete and thereby slow down the performance of the computer system.

Thus, what is needed are a PCI subsystem and a bridge that can ensure completion of posted write operation to a primary PCI agent before sending out an interrupt message. In addition, what is also needed are a PCI subsystem and a bridge that can properly order and transmit message signaled interrupts to a host computer.

SUMMARY OF THE INVENTION

The present invention fills these needs by providing message signaled interrupt generating device and method. It should be appreciated that the present invention can be implemented in numerous ways, including as a process, an apparatus, a system, a device, a method, or a computer readable medium. Several inventive embodiments of the present invention are described below.

In one aspect of the invention, the present invention provides a bridge device for generating message signaled interrupts to indicate completion of write transactions from one or more secondary bus devices to a primary bus device. The bridge device is coupled between a first bus and a second bus. The one or more secondary bus devices are coupled to the second bus and the primary bus device is coupled to the first bus. The bridge device includes a bridge FIFO and control circuitry, a first register, and an interrupt generation logic. The bridge FIFO and control circuitry is arranged to control data transfer between the one or more secondary bus devices and the primary bus device. The bridge FIFO and control circuitry is further configured to store and transfer write data from the one or more secondary bus devices to the primary bus device. The first register is arranged to store a set of interrupt bit numbers. Each of the one or more secondary bus devices is configured to write an interrupt bit number into the first register after completion of a write data transfer to the bridge FIFO and control circuitry to indicate completion of the write data transfer. The interrupt generation logic is coupled to the bridge FIFO and control circuitry and the first register, and is arranged to generate message signaled interrupts in response to the writing of the interrupt bit numbers. In this configuration, the interrupt generation logic generates the message signaled interrupts in the order the write data transfers are posted to the first bus. In addition, each of the message signaled interrupts is generated and posted after all write data transfers associated with the interrupt bit number have been posted to the first bus.

In another aspect of the invention, the present invention provides a method for generating message signaled interrupts to indicate completion of write transactions from one or more secondary bus devices to a primary bus device. The primary bus device is coupled to a first bus and the one or more secondary bus devices are coupled to a second bus. In this method, write data from the one or more secondary bus devices are received and stored for transfer to the primary bus device over the first bus. A set of interrupt bit numbers are received and stored in a first register, wherein each of the one or more secondary bus devices is configured to write an interrupt bit number into the first register after completion of a write data transfer to indicate completion of the write data transfer. In response to the writing of the interrupt bit numbers, message signaled interrupts are generated and posted in the order the write data transfers are posted to the first bus. Each of the message signaled interrupts is generated and posted after all write data transfers associated with the interrupt bit number have been posted to the first bus.

The present invention thus ensures that any posted writes that were pending when an interrupt message is received from the secondary bus devices are written before generating and posting an associated message signaled interrupt. Preferably, a circular queue is used to sequentially store the interrupt bit numbers in the order written from the one or more secondary PCI devices. The stored interrupt bit numbers are then output in the order the write data transfers are posted to the primary PCI bus. In addition, pending posted write registers store the number of posted writes that must be completed before an associated message signaled interrupt is generated and posted. The values in the pending posted write registers are then decremented if they are non-zero when a posted write is completed. The posting of the message signaled interrupt is delayed until all posted writes that were pending when the associated interrupt bit number has been received by tracking the interrupt bit numbers and associated number of posted writes. Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

The present invention, message signaled interrupt generating device and method, is described. It will be obvious, however, to one skilled in the art, that the present invention may be practiced without some or all of these specific details. In other instances, well known process operations have not been described in detail in order not to unnecessarily obscure the present invention.

The present invention provides a bridge device and a bus subsystem that ensures proper ordering of interrupt signaled messages relative to posted data writes. In a write transaction, a secondary bus device sends data to the bridge and then posts an interrupt message to the bridge device by writing an interrupt register in the bridge. The bridge waits for flushing of any posted writes of data to primary PCI bus and then generates a message signaled interrupt. In this manner, the bridge device guarantees that posted data is sent before generating an associated message signaled interrupt. Furthermore, the bridge device includes a circular queue to generate message signaled interrupts in a proper order relative to posted write transactions.

Figure 1:
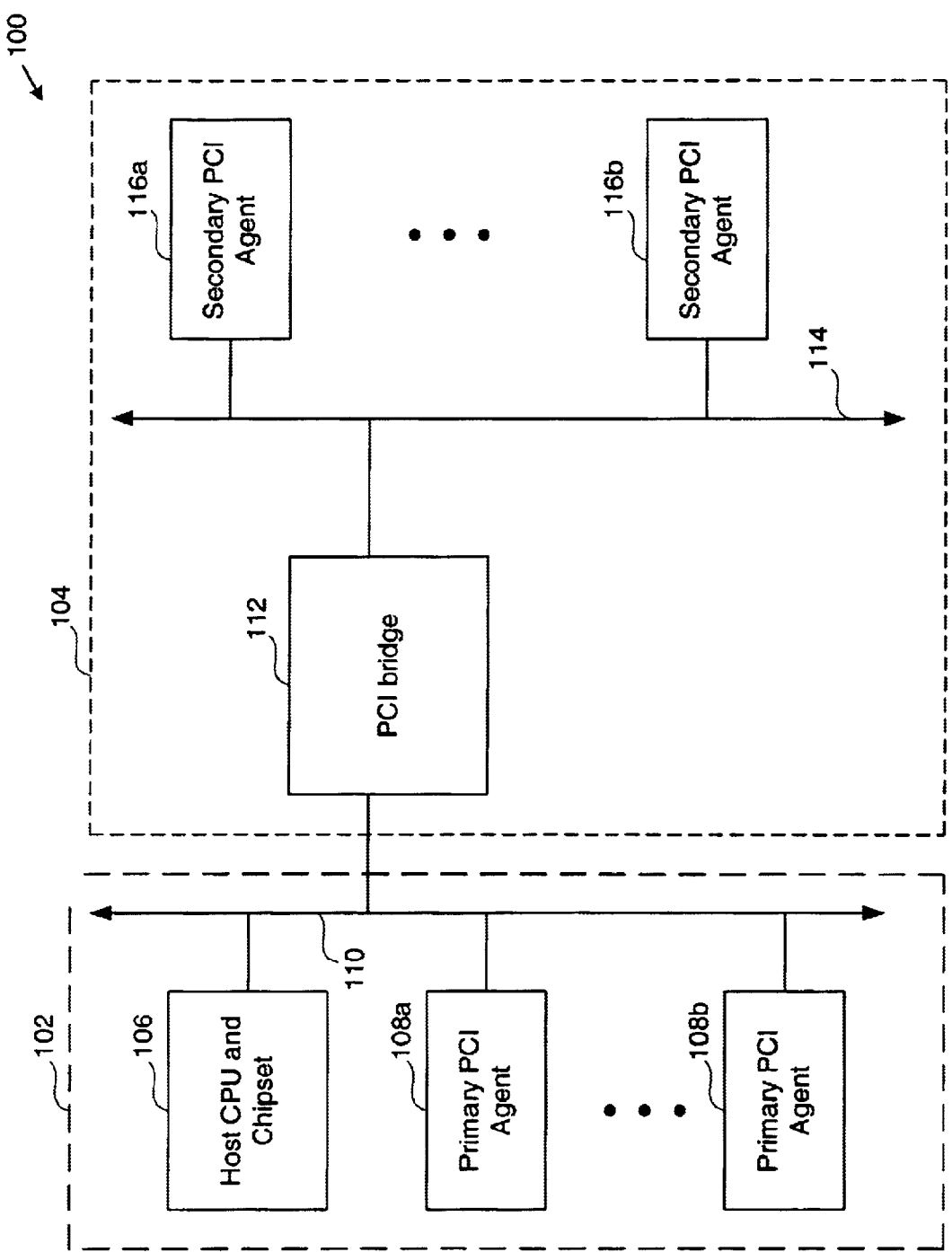
FIG. 1 illustrates a schematic block diagram of an exemplary computer system having a host computer and a PCI bus subsystem in accordance with one embodiment of the present invention.

FIG. 1 illustrates a schematic block diagram of an exemplary computer system 100 having a host computer 102 and a PCI bus subsystem 104 in accordance with one embodiment of the present invention. The host computer 102 includes a host CPU and chipset 106, one or more primary PCI agents 108, and a primary PCI bus 110. The host CPU and chipset 106 is coupled to the primary PCI bus 110 and processes information such as data and instructions. In addition, the host CPU and chipset 106 provides functions of conventional host chipset circuitry and memory controller for controlling access to a main memory (not shown). The primary PCI agents 108 are coupled to the primary PCI bus 110 to provide additional functions and may be devices such as a hard drive, sound card, graphics controller card, etc. The primary PCI bus 110 serves as a host bus, to which additional devices can be connected via one or more host adapters. Although the present invention is illustrated using PCI bus and bus subsystem, it may employ any suitable buses such as ISA, VESA, AGP, or the like and corresponding bus subsystems. In addition, it should be appreciated that the present invention applies to PCI-X systems, buses, and devices as well as PCI systems, buses, and devices.

The PCI bus subsystem 104 includes a secondary PCI bridge 114, a secondary PCI bus 114, and one or more secondary PCI agents 116. The PCI bridge 112 is coupled to coordinate data and command transfers between the primary and secondary PCI buses 110 and 114. The secondary PCI agents 116A and 116B are coupled to the secondary PCI bus 114 to provide enhanced functions to the host computer system 102 via the PCI bridge 112. The secondary PCI agents 116 may be any devices that can b e coupled to the PCI bus 114 to supplement the functions of the host computer 102 such as storage devices, I/O devices, etc. For example, the PCI agents may include any suitable PCI devices such as tape drives, optical drives, magnetic drives, scanners, printers, and other I/O devices and controllers.

The PCI bridge 112, primary PCI agents 108, and secondary PCI agents 116 are commonly known as PCI devices and may function as either a master or a slave device. A master device is one that can arbitrate for access to a bus to communicate with a slave (i.e., target) device. A master that has won arbitration and has been granted access to the bus is called an initiator. The initiator typically starts a transaction by asserting FRAME# and driving the address and command (e.g., request) signals onto the bus. For example, the secondary PCI agent 116A, as an initiator, may issue a read command to read data from the host computer 102. The PCI bridge 112 receives the request as a slave on the secondary bus side and issues a proxy request as a master to the host computer 102, which transmits the data to the secondary PCI agent 116A via the PCI bridge 112.

Figure 2:
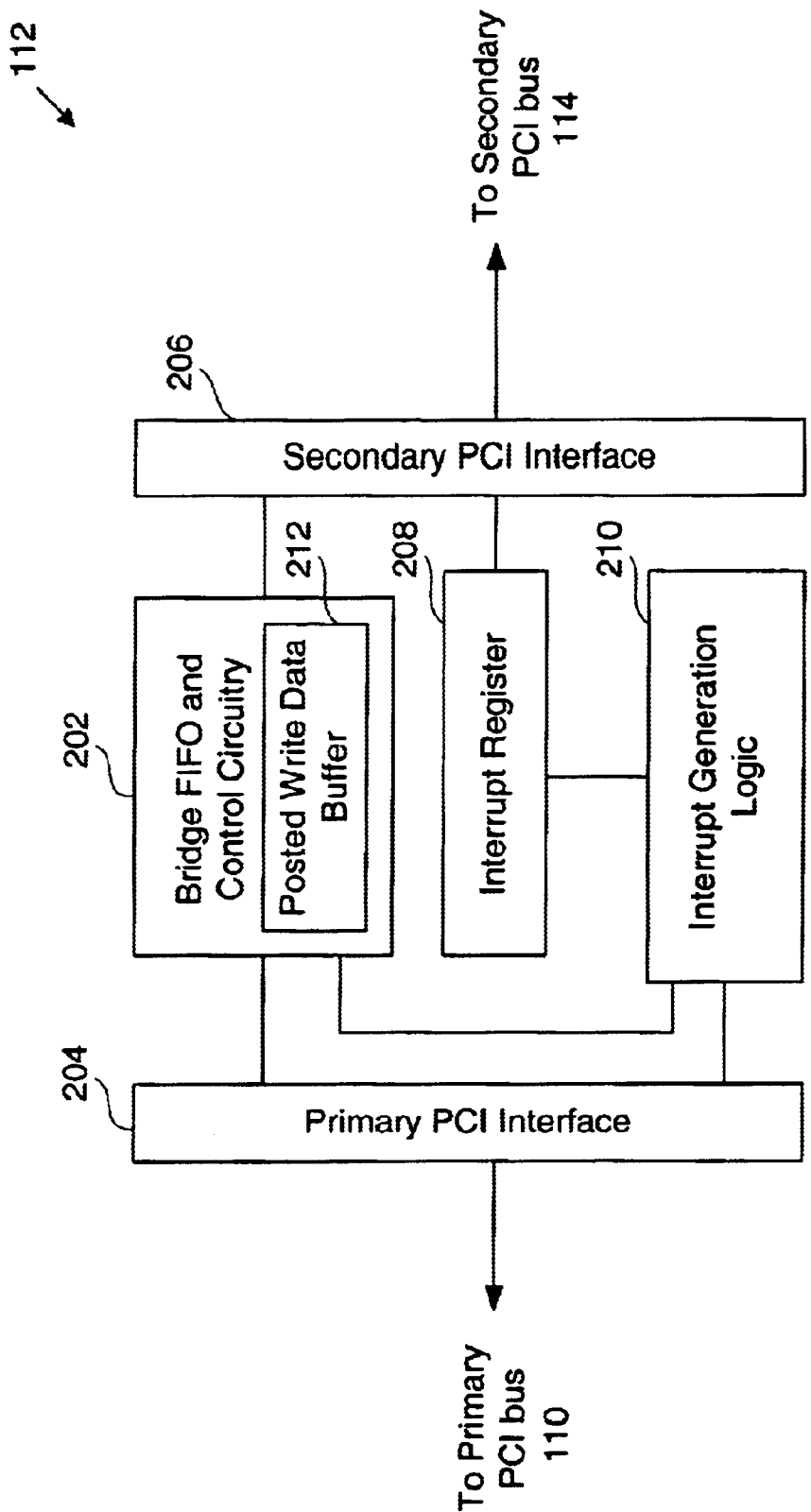
FIG. 2 shows a block diagram of a PCI bridge in accordance with one embodiment of the present invention.

To facilitate communication of message signaled interrupts between the host computer 102 and the secondary PCI agents 116, the PCI bridge 112 implements an interrupt generation logic and an interrupt register. FIG. 2 shows a more detailed block diagram of the PCI bridge 112 in accordance with one embodiment of the present invention. As shown, the PCI bridge 112 includes bridge FIFO and control circuitry 202, a primary PCI interface 204, a secondary PCI interface 206, an interrupt register 208, and an interrupt generation logic 210. The PCI interfaces 204 and 206 provide the bridge 112 with interface functions between the primary and secondary PCI buses 110 and 114 for communicating data and control signals. In particular, the primary PCI interface 204 interfaces with the primary PCI bus 110 on the host side while the secondary PCI interface 206 interfaces with the secondary PCI bus 114.

The PCI bridge 112 functions to facilitate communication between devices coupled to the primary PCI bus 110 and the secondary PCI bus 114 by mapping address space of one bus into the address space of the other bus. Specifically, the bridge FIFO and control circuitry 202 provided between the primary and secondary PCI bus interfaces 204 and 206 receives transactions (e.g., requests or commands) on one bus as a slave and determines whether to pass the transaction to the other bus. When it determines that the transaction is to be passed on to the other bus, the bridge FIFO and control circuitry 202 transmits the transaction onto the other bus as a master. For example, the bridge FIFO and control circuitry 202 may receive and transmit a request between the PCI buses 110 and 114 via PCI interfaces 204 and 206.

For arbitrating access to the secondary PCI bus 114, a conventional PCI arbiter (not shown) may also be provided internally between the secondary PCI interface 206 and the bridge FIFO and control circuitry 202 or externally coupled to the secondary PCI bus 114. The arbiter receives and evaluates requests for access to the secondary PCI bus from one or more PCI devices (e.g., SCSI adapter, RAID controller) attached to the secondary PCI bus 114 and grants the PCI bus to one of the requesting PCI devices as a bus master. In selecting a bus master, the PCI arbiter may implement any well-known system-specific arbitration algorithm.

With continuing reference to FIG. 2, the bridge FIFO and control circuitry 202 includes a data buffer 212. The data buffer 212 stores posted data written from devices attached to the buses 110 and 114 for transmission to specified devices coupled to the primary and secondary PCI buses 110 and 114. For example, to transmit data from the secondary PCI agent 116A to the primary PCI agent 108A, the secondary PCI agent 116A writes the data to the posted write data buffer 212 in the PCI bridge 112. As will be discussed in more detail below, the secondary PCI agent then writes to the interrupt register 208 in the PCI bridge 112 via the secondary PCI interface 206 to indicate completion of the data transfer. The interrupt generation logic 210 is coupled to the interrupt register 208, bridge FIFO and control circuitry 202, and primary PCI interface 204. When the interrupt register 208 is written, the interrupt generation logic 210 generates and sends a message signaled interrupt to the host computer 102 via primary PCI bus 110.

Figure 3:
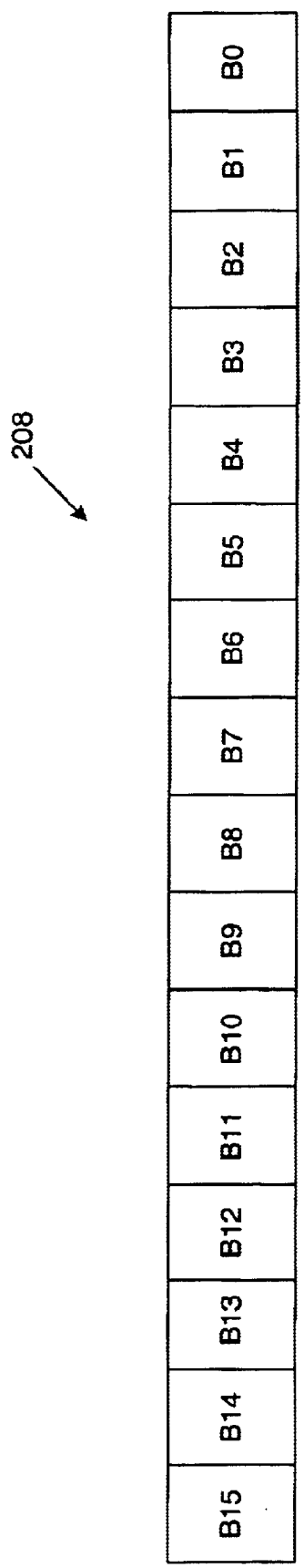
FIG. 3 shows an exemplary interrupt register coupled between a secondary PCI interface and an interrupt generation logic in accordance with one embodiment of the present invention.

FIG. 3 shows an exemplary interrupt register 208 coupled between the secondary PCI interface 206 and the interrupt generation logic 210 in accordance with one embodiment of the present invention. The interrupt register 208 is configured to store 16 bits of information from bit 0 (i.e., B0) to bit 15 (i.e., B15). As is well known in the art, PCI devices may communicate different types of interrupt messages. In one embodiment, each bit in the interrupt register 208 indicates an interrupt message for a specified interrupt type. Thus, up to 16 different types of interrupt messages can be communicated via the interrupt register 208. In another embodiment, each of the bits in the interrupt register 208 may be associated with one of the secondary PCI devices. In this case, a secondary PCI device writes an interrupt message into an associated interrupt bit in the interrupt register 208. Although the present invention is illustrated using a 16-bit interrupt register, it may also employ any suitable number of bits (e.g., 8 bits, 32 bits, etc.) in the interrupt register to generate message signaled interrupts.

Figure 4:
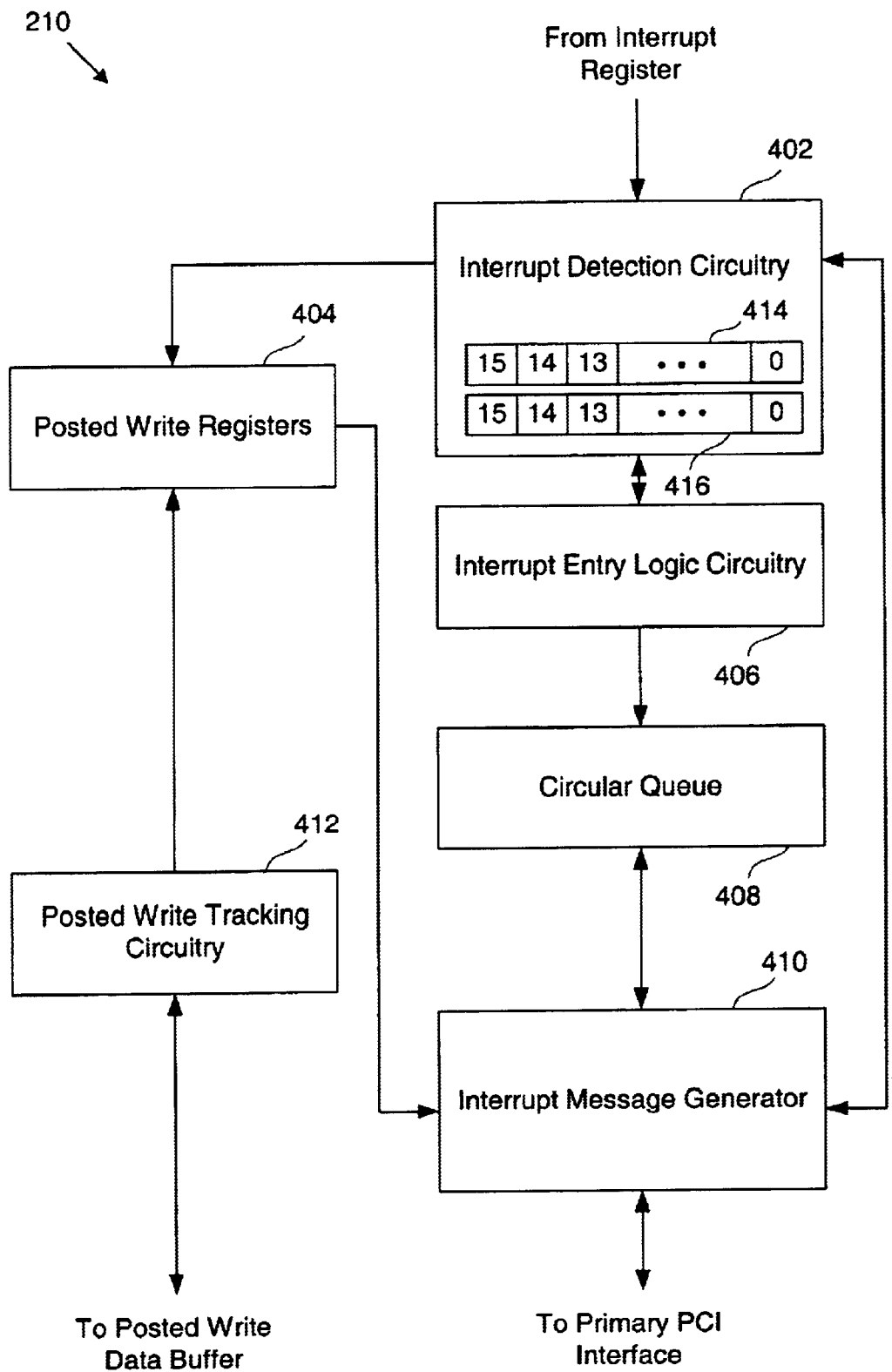
FIG. 4 shows a more detailed schematic block diagram of the interrupt generation logic in accordance with one embodiment of the present invention.

The interrupt generation logic 210 is configured to access the interrupt register for generating message signaled interrupts with proper ordering relative to posted write transactions. FIG. 4 shows a more detailed schematic block diagram of the interrupt generation logic 210 in accordance with one embodiment of the present invention. The interrupt generation logic 210 includes interrupt detection circuitry 402, posted write registers 404, interrupt entry logic circuitry 406, a circular queue 408, an interrupt message generator 410, and posted write tracking circuitry 412. The interrupt detection circuitry 402 is coupled to receive the contents of the interrupt register 208 to detect an incoming interrupt and writes the number of outstanding posted writes into the posted write registers 404, which is coupled to the interrupt detection circuitry.

The interrupt detection circuitry 402 includes a pair of registers 414 and 416 for storing interrupt_pending and need_to_queue flags for each of the bits B0 to B15 in the interrupt register 208. Specifically, the interrupt_pending register 414 stores 16 interrupt_pending (IP) flag bits indicating whether an interrupt message is pending for each of the bits B0 to B15 in the interrupt register 208. On the other hand, the need_to_queue register 416 stores 16 need_to_queue (NQ) flag bits indicating whether the interrupts need to be queued for each of the bits B0 to B15 in the interrupt register 208.

The interrupt entry logic circuitry 406 is coupled between the interrupt detection circuitry 402 and the circular queue 408 and is configured to enter the interrupt bit number into the circular queue 408. The circular queue 408 receives the interrupt bit number and keeps track of the order of the interrupt bits as they are received from the interrupt entry logic circuitry 406.

Figure 5:
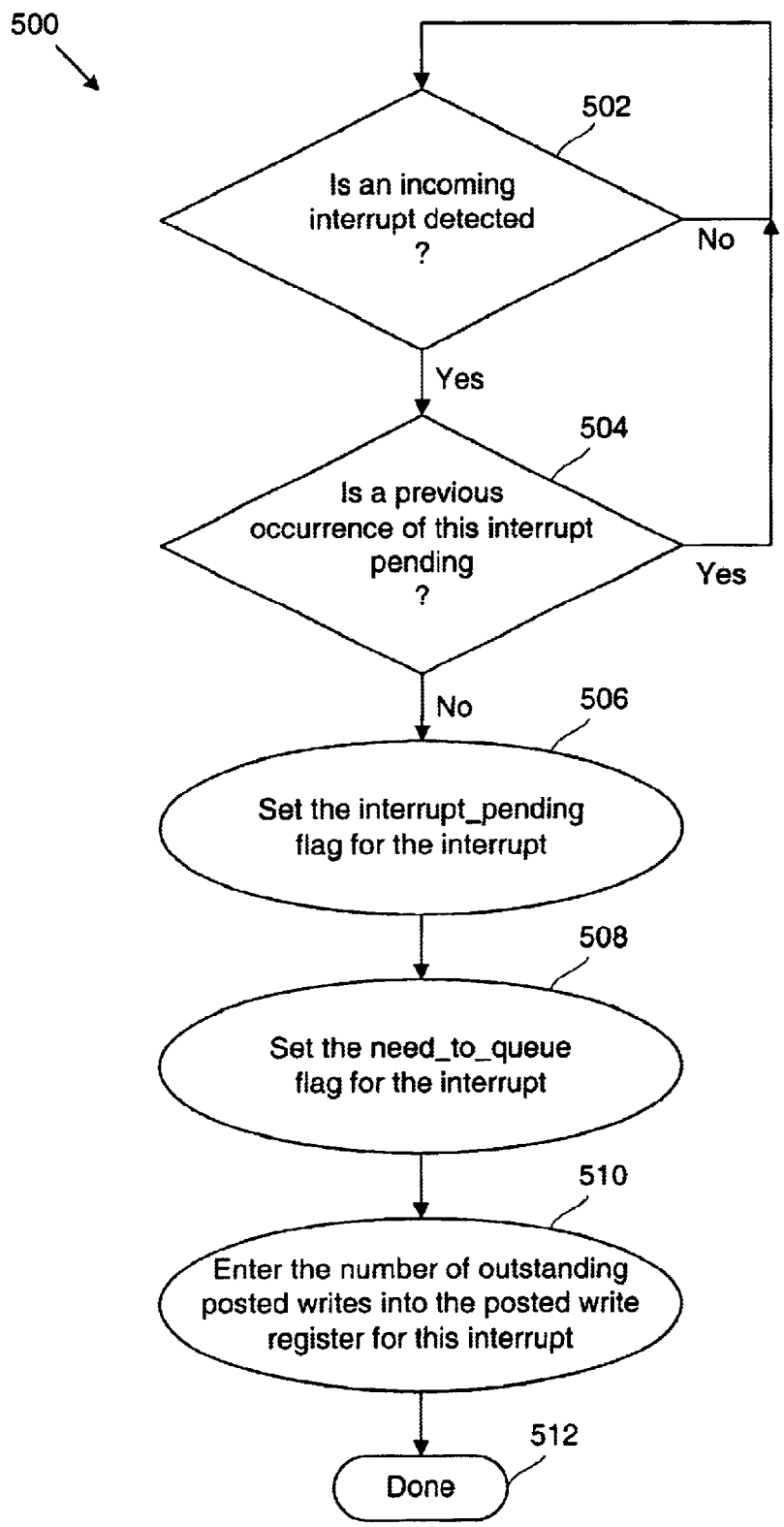
FIG. 5 shows a flow chart of a method performed by an interrupt detection circuitry in accordance with one embodiment of the present invention.

FIG. 5 shows a flow chart of a method 500 performed by the interrupt detection circuitry 402 in accordance with one embodiment of the present invention. In operation 502, the interrupt detection circuitry 402 determines whether an incoming interrupt has been detected. For example, whenever a secondary PCI devices writes to the interrupt register 208, the interrupt detection circuitry 402 detects the interrupt bit number (e.g., interrupt bit position) written.

Once the writing of an interrupt bit is detected, the method proceeds to operation 504 to determine if a previous occurrence of the interrupt bit is pending by referencing an associated interrupt_pending bit in the interrupt_pending register 414. For example, if interrupt bit B3 has been written, the interrupt detection circuitry 402 checks bit number IP3 of the interrupt_pending register 414. If a previous occurrence of the interrupt bit is pending, the method proceeds back to operation 502 to detect writing of another interrupt message.

The use of IP flag bits in the interrupt_pending register 414 in this manner allows generation of a single message signaled interrupt for a detected interrupt bit instead of multiple message signaled interrupts. For example, when interrupt bit B3 is written by a secondary PCI device, the associated IP flag bit may indicate that a previous interrupt for the interrupt bit B3 is still pending (i.e., queued) because the primary PCI bus may be busy. In this case, the PCI bridge 112 waits until the primary PCI bus becomes available. In the meantime, the secondary PCI device may write another interrupt message into interrupt bit B3. Since the IP flag bit for the interrupt bit B3 has been set previously to trigger generation of a message signaled interrupt, the PCI bridge 112 need not create another message signaled interrupt for the interrupt bit B3. The IP flag bits thus eliminates generation of duplicate or multiple message signaled interrupts;

In operation 504, if the detected interrupt bit is not pending in the interrupt_pending register 414, the method proceeds to operation 506, where the IP bit associated with the detected interrupt bit is set in the interrupt_pending register 414. The setting of the IP bit indicates that the interrupt is pending for the associated interrupt bit. After writing to the associated interrupt_pending bit, the NQ bit associated with the detected interrupt bit is set in the need_to_queue register 416 in operation 508.

The setting of the NQ bit allows the associated interrupt bit number to be queued for entry into the circular queue 408. For example, when more than one interrupt bit number are detected, the interrupt bit numbers are queued one at a time for entry into the circular buffer 408. As will be discussed in more detail below, when an interrupt bit number is entered into the circular buffer 408, the associated NQ flag bit is cleared. Once the NQ bit has been set, the number of outstanding posted writes is written, in operation 510, into one of the posted write registers 404 associated with the detected interrupt bit. The method 500 then terminates in operation 512.

Figure 6:
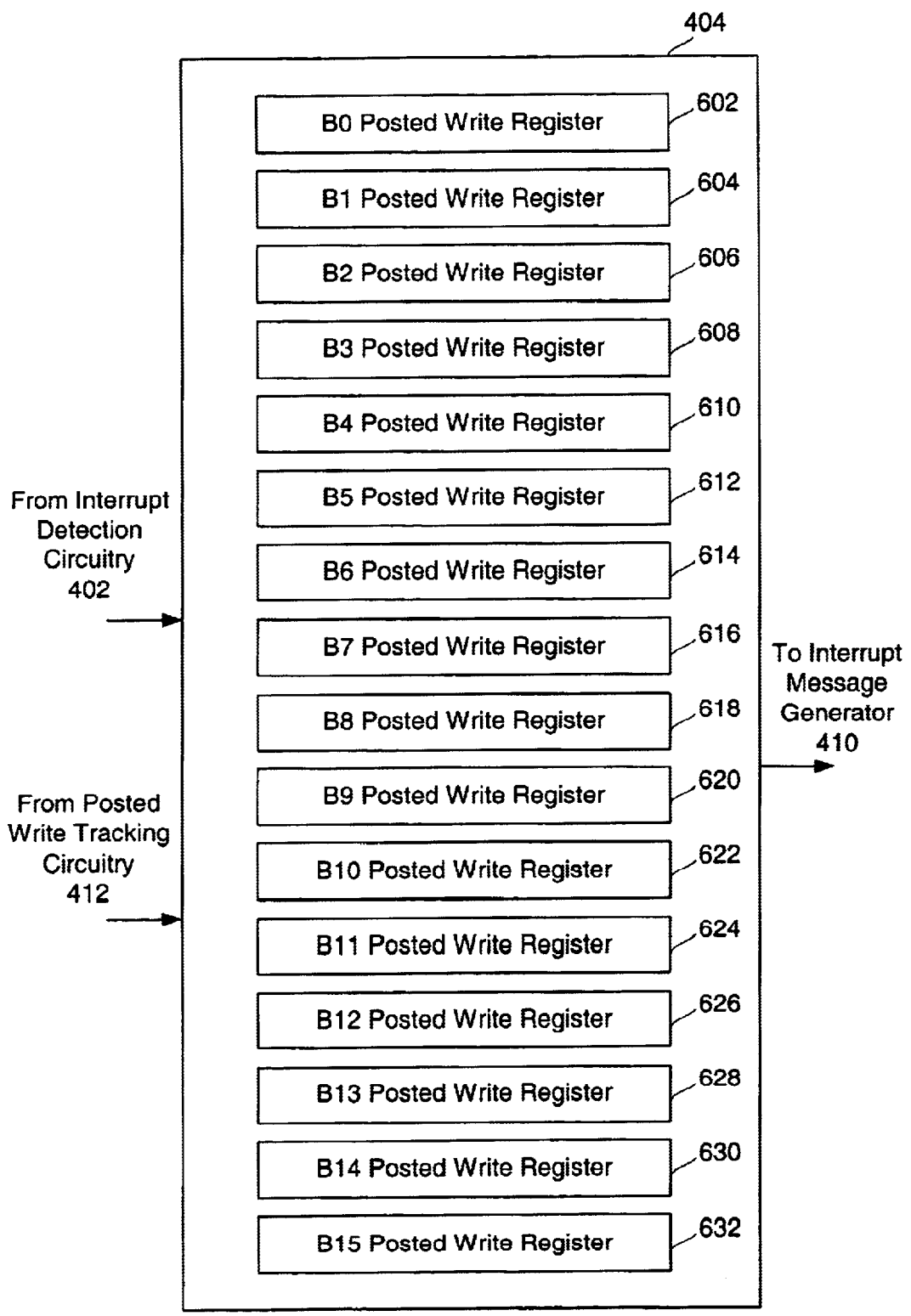
FIG. 6 is a schematic block diagram of posted write registers for keeping track of the posted writes in accordance with one embodiment of the present invention.

FIG. 6 is a schematic block diagram of the posted write registers 404 for keeping track of the pending posted writes in accordance with one embodiment of the present invention. The posted write registers 404 includes 16 registers 602 to 632, each of which stores the number of posted writes pending for the associated interrupt bit number. For example, the posted write register 602 stores the number of pending posted writes for the interrupt bit B0 while the posted write register 608 stores the number of pending posted writes for the interrupt bit B3. The number of posted write registers is preferably equal to the number of interrupt bits in the interrupt register 208.

In this configuration, when the interrupt detection circuitry 402 detects the writing of an interrupt bit in the interrupt register 208, the number of pending posted writes that are outstanding is entered into a corresponding posted write register and is provided to the interrupt message generator 410. The posted write registers 404 are coupled to the posted write tracking circuitry 412, which keeps track of posted writes to the primary PCI bus 110 from the PCI bridge 112. Whenever write data is posted from the PCI bridge 112 to the primary PCI bus 110, the posted write tracking circuitry 412 transmits a decrement signal to the posted write registers 404. In response to the decrement signal, all posted write registers 404 with a non-zero value are decremented by one. In this manner, the pending posted write registers 404 are used to hold the number of posted writes that must be completed before the interrupt message is generated and posted over the primary PCI bus 110.

Figure 7:
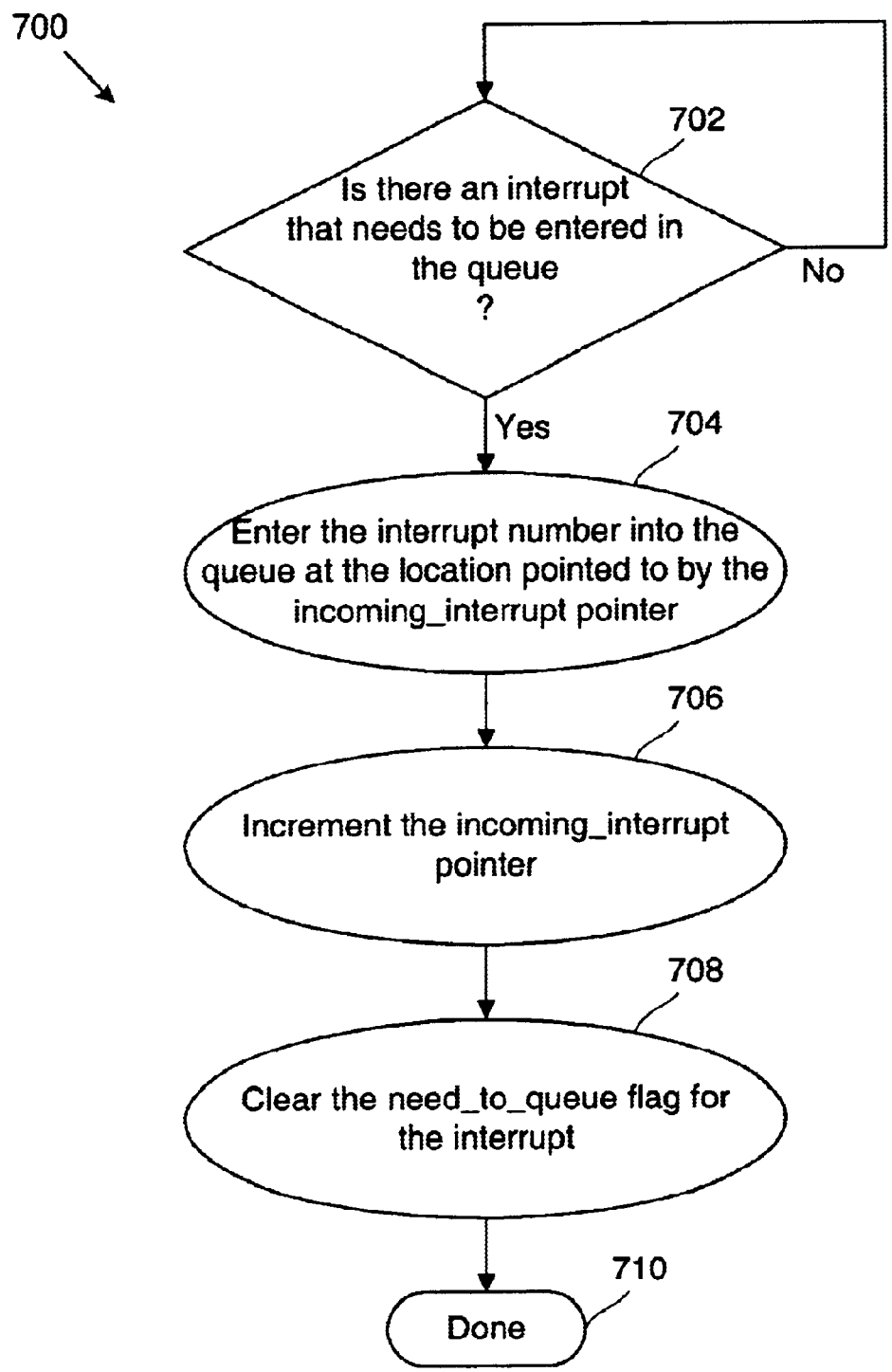
FIG. 7 illustrates a flow chart of a method performed by interrupt entry logic circuitry in accordance with one embodiment of the present invention.

FIG. 7 illustrates a flow chart of a method performed by the interrupt entry logic circuitry 406 in accordance with one embodiment of the present invention. In operation 702, the interrupt entry logic circuitry 406 determines whether there is an interrupt that needs to be entered into the circular queue 408. If not, the method proceeds back to operation 702 until it is determined that an interrupt needs to be entered into the queue 408. When an interrupt needs to be entered into the circular queue 408, the interrupt bit number is entered, in operation 704, into the queue 408 at the location pointed to by an incoming_interrupt pointer in the queue 408. After the interrupt bit number has been entered, the incoming_interrupt pointer is incremented to point to the next location in the circular queue 408 in operation 706. At this point, the corresponding NQ flag bit in the need_to_queue register 416 is cleared in operation 708. The method then terminates in operation 710.

Figure 8:
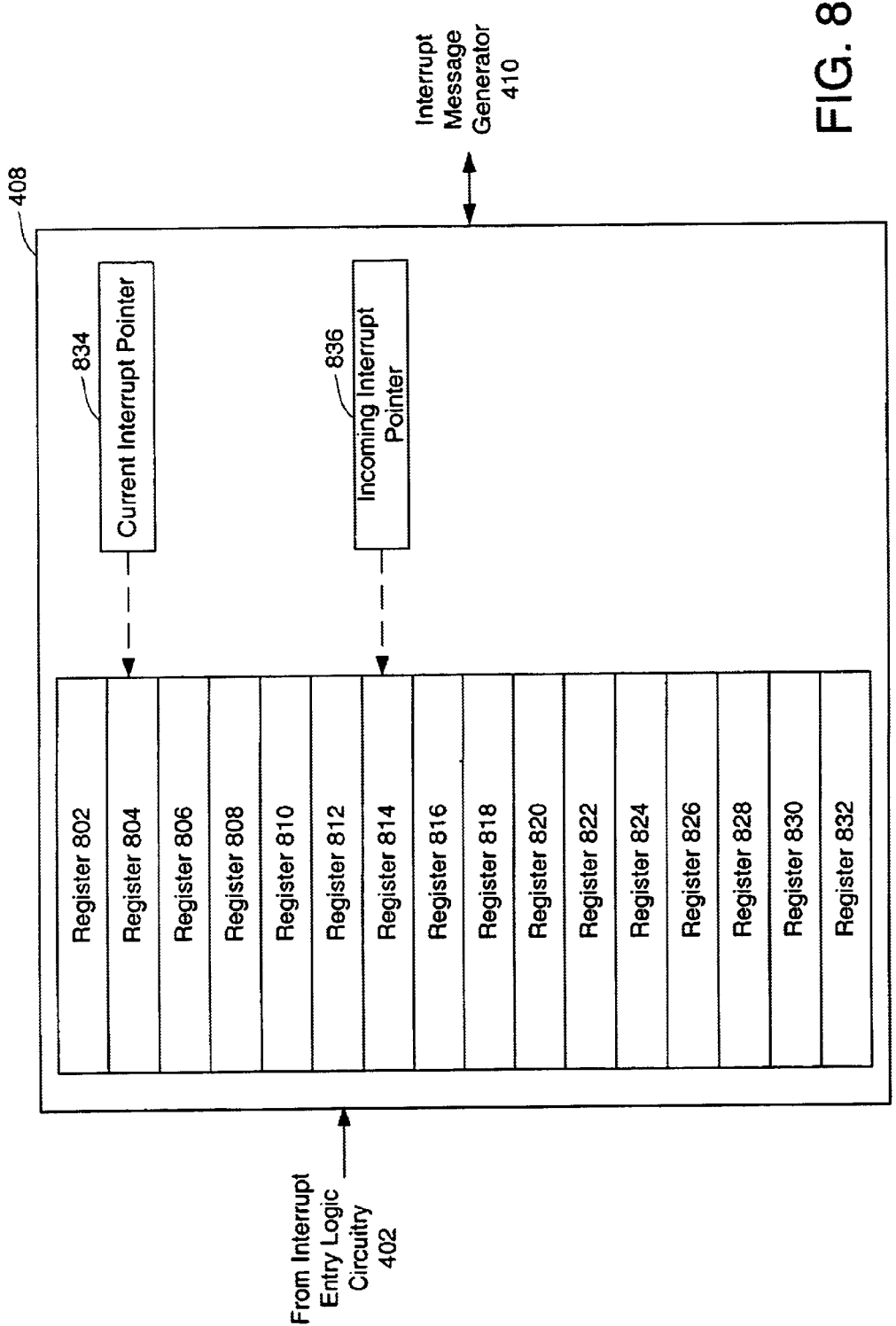
FIG. 8 shows a schematic block diagram of a circular queue in accordance with one embodiment of the present invention.

FIG. 8 shows a more detailed schematic block diagram of the circular queue 408 in accordance with one embodiment of the present invention. The circular queue 408 includes 16 registers 802 to 832 that are circularly linked to queue interrupt bit numbers in the order they are received. An incoming interrupt register 836 in the circular queue 408 keeps track of the register location in which an incoming interrupt number is to be stored. Specifically, the incoming interrupt register 836 points to one of the registers 802 to 832 into which an incoming interrupt bit number from the interrupt entry logic circuitry 406 is to be stored. When interrupt bit number has been stored, the circular queue 408 increments the incoming interrupt register 836 to point to the next register in the circular chain of registers 802 to 832. In this manner, incoming interrupt bit numbers are queued in order.

In addition, a current interrupt pointer 834 points to one of the registers 802 to 832 to keep track of the register location from which the stored interrupt bit number is sent to the interrupt message generator 410. When the interrupt bit number is received, the interrupt message generator 410 generates a message signaled interrupt, which is sent to the primary PCI bus 110 via primary PCI interface 204.

By way of example, registers 802 to 810 may store interrupt bit numbers 5, 3, 2, 0, and 4, respectively, in the order received. When the current interrupt pointer 834 points to register 804, it means that the interrupt bit number 5 from register 802 has gone out to the interrupt message generator 410 for generating a message signaled interrupt. The depth of the queue is equal to the maximum number of unique interrupts that can be generated within the PCI bridge 112. If the same interrupt is received before it has gone out, the new occurrence is not entered into the queue 408 since only one interrupt message needs to be generated for each interrupt bit number regardless of how many times it is received. Because the queue 408 is circular, the pointers 834 and 836 wrap around to the first entry (i.e., first entry register 802) once the pointers are incremented past the end of the queue (i.e., last entry register 832).

Figure 9:
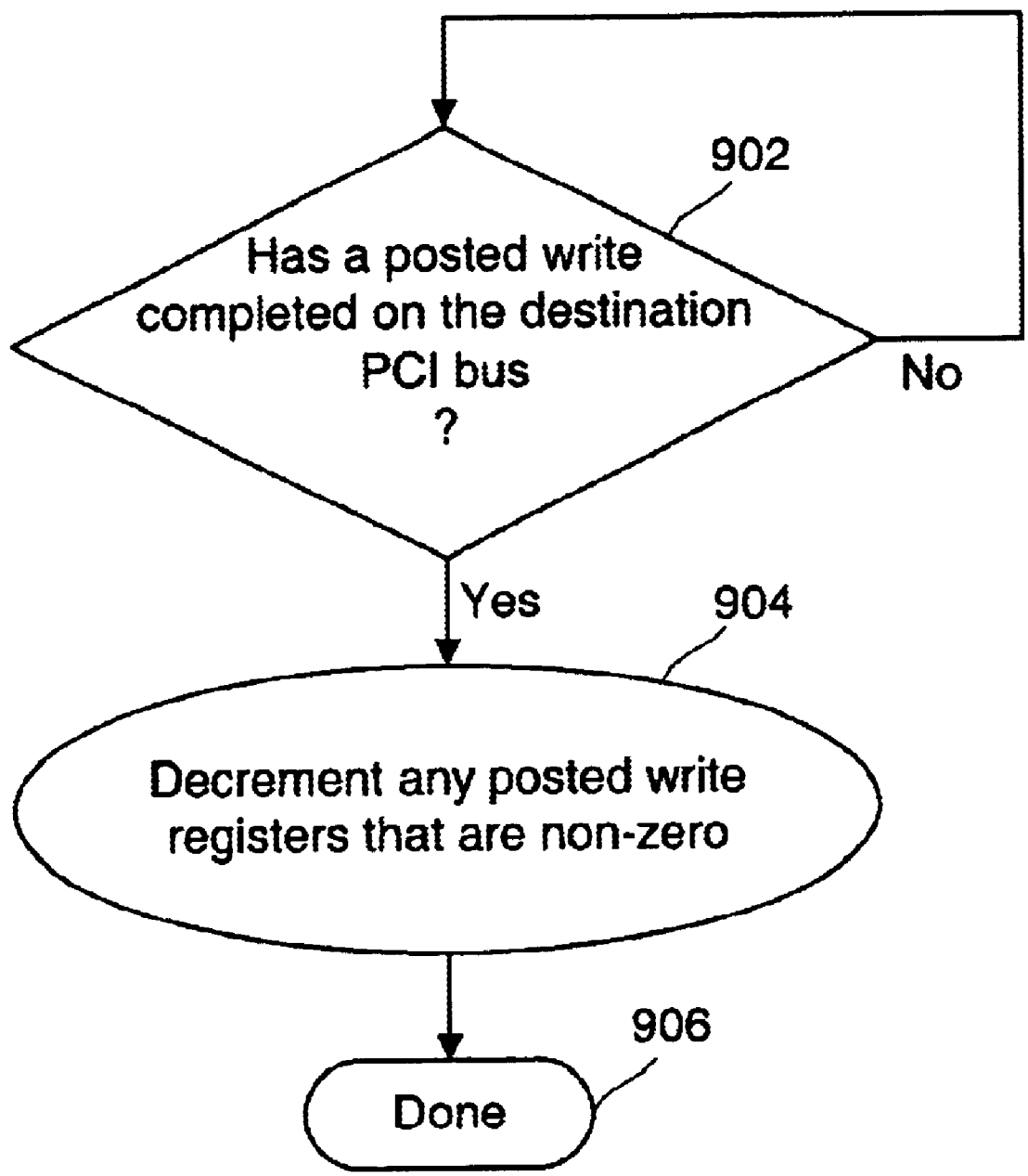
FIG. 9 illustrates a flow chart of a method performed by a posted write tracking circuitry in accordance with one embodiment of the present invention.

FIG. 9 illustrates a flow chart of a method performed by the posted write tracking circuitry 412 in accordance with one embodiment of the present invention. In operation 902, the posted write tracking circuitry 412 determines whether a posted write has completed on the destination PCI bus (e.g., primary PCI bus 110). If not, the method proceeds back to operation 902 until a posted write has been completed on the destination PCI bus. On the other hand, when a posted write has been completed on the destination PCI bus, the method proceeds to operation 904, where all posted write registers that are non-zero are decremented by one. The method then terminates in operation 906.

Figure 10:
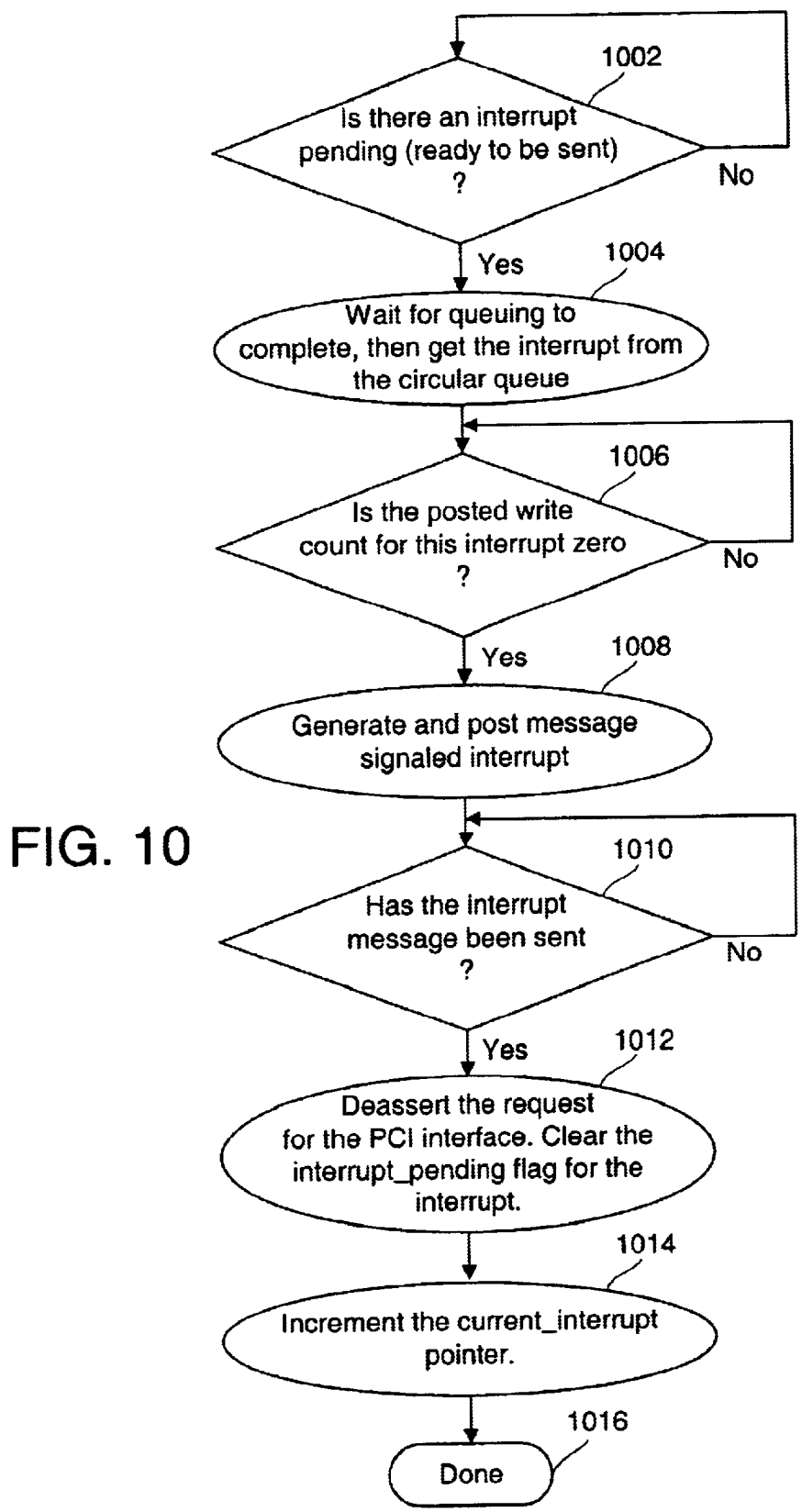
FIG. 10 shows a flow chart of a method performed by the interrupt message generator in accordance with one embodiment of the present invention.

FIG. 10 shows a flow chart of a method performed by the interrupt message generator 410 in accordance with one embodiment of the present invention. The method begins in operation 1002, where the interrupt message generator 410 determines whether a message signaled interrupt is pending, i.e., ready to be sent, by examining the interrupt_pending flag register 414 of the interrupt detection circuitry 402. When a message signaled interrupt is pending, the method proceeds to operation 1004, where the interrupt message generator 410 waits for the queuing to complete by waiting for need_to_queue flag associated with the message signaled interrupt (i.e., interrupt bit number) to clear from the interrupt detection circuitry 402. After the NQ flag has been cleared, the interrupt message generator 410 obtains an interrupt bit number from the circular buffer 408 from the location pointed to by the current interrupt pointer 834.

Once the interrupt bit number has been obtained, the interrupt message generator 410 determines whether the pending posted write count for the interrupt bit number is zero in operation 1006. For this purpose, the interrupt message generator 410 is coupled to the pending posted write registers 404 to access the stored number of posted writes. If the pending posted write count for the interrupt bit number is non-zero, the interrupt message generator 410 waits until the count becomes zero. When the write count is zero, the method proceeds to operation 1008, where the interrupt message generator 410 generates a request and a message signaled interrupt for the interrupt bit number to the PCI interface for transmission to the primary PCI interface 204. This ensures that the posting of the message signaled interrupt is delayed until all posted writes that were pending when the interrupt occurred have been posted to the primary PCI bus 110.

Then in operation 1010, it is determined whether the message signaled interrupt has been sent out to the primary PCI interface 110. For example, a message signaled interrupt is sent if the primary PCI interface 110 returns a "sent" signal to the interrupt message generator 410. In such cases, the request to the PCI interface 110 is deasserted and the interrupt_pending flag for the transmitted interrupt bit number is cleared in operation 1012. However, if the message signaled interrupt has not been sent out, the interrupt message generator 410 waits until it has been sent out. After clearing the interrupt pending flag, the current_interrupt pointer 834 of the circular queue 408 is incremented to point to the next register location for generating the next message signaled interrupt for transmission. The method then terminates in operation 1016.

The present invention thus ensures that any posted writes that were pending when an interrupt message is received from the secondary bus devices are written before generating and posting an associated message signaled interrupt. The pending posted write registers store the number of posted writes that must be completed before an associated message signaled interrupt is generated and posted. The values in the pending posted write registers are then decremented if they are non-zero when a posted write is completed. Delaying the posting of the message signaled interrupt until all posted writes that were pending when the associated interrupt bit number has been received ensures proper ordering of message signaled interrupts relative to the posted writes.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A bridge device for generating message signaled interrupts to indicate completion of write transactions from one or more secondary bus devices to a primary bus device, said bridge device being coupled between a first bus and a second bus, said one or more secondary bus devices being coupled to said second bus and said primary bus device being coupled to said first bus, the bridge device comprising:

a bridge FIFO and control circuitry for controlling data transfer between said one or more secondary bus devices and said primary bus device, said bridge FIFO and control circuitry being configured to store and transfer write data from said one or more secondary bus devices to said primary bus device;

a first register for storing a set of interrupt bit numbers, wherein each of said one or more secondary bus devices is configured to write an interrupt bit number into said first register after completion of a write data transfer to said bridge FIFO and control circuitry to indicate completion of said write data transfer; and an interrupt generation logic coupled to said bridge FIFO and control circuitry and said first register for generating message signaled interrupts in response to said writing of said interrupt bit numbers, wherein said interrupt generation logic generates said message signaled interrupts in the order said write data transfers are posted to said first bus, said interrupt generation logic further includes a circular queue for tacking said interrupt bit numbers to maintain the generation of message signaled interrupts in order relative to write data transfers posted to said first bus, and wherein each of said message signaled interrupts is generated and posted after all write data transfers associated with said interrupt bit number have been posted to said first bus.

2. The bridge device as recited in claim 1, wherein said interrupt generation logic generates said message signaled interrupts as write transactions.

3. The bridge device as recited in claim 1, wherein said interrupt generation logic further comprises:

an interrupt detection circuitry arranged to detect said writing of said interrupt bit numbers in said first register;

a posted write tracking circuitry arranged to track posting of said write data transfers to said first bus;

a set of posted write registers coupled between said posted write tracking circuitry and said interrupt detection circuitry with one posted write register being provided for each of the interrupt bit numbers in said first register, each of said posted write registers being arranged to store the number of outstanding write data transfers that have not been posted to said first bus;

the circular queue for sequentially storing said interrupt bit numbers in the order written from said one or more secondary bus devices, wherein said circular queue is arranged to output said interrupt bit numbers sequentially in the order said write data transfers are posted to said first bus;

an interrupt entry logic circuitry arranged to sequentially enter said interrupt bit numbers from said interrupt generation logic into said circular queue in the order written from said one or more secondary bus devices; and an interrupt message generator arranged to generate and post said message signaled interrupts in response to said output interrupt bit numbers from said circular queue.

4. The bridge device as recited in claim 3, wherein said interrupt detection circuitry includes:

a second register for storing a set of first flags with one first flag for each of the interrupt bits in said first register, each first flag indicating whether an associated interrupt bit number is pending in said circular queue; and a third register for storing a set of second flags with one second flag for each of the interrupt bits in said first register, each second flag indicating whether an associated interrupt bit needs to be queued in said circular queue.

5. The bridge device as recited in claim 4, wherein said circular queue includes:

a set of circularly linked fourth registers for storing said interrupt bit numbers with one fourth register being provided for each of said interrupt bit numbers;

an incoming interrupt pointer arranged to point to one of the fourth registers to indicate where an incoming interrupt bit number from said interrupt entry logic circuitry is to be stored; and a current interrupt pointer arranged to point to one of the fourth registers to indicate an interrupt bit number to be provided to said interrupt message generator.

6. The bridge devices as recited in claim 5, wherein any posted write registers that have a non-zero value is decremented by one when a write data transfer has been posted to said first bus.

7. The bridge device as recited in claim 6, wherein, when said interrupt entry logic circuitry enters an interrupt bit number into said circular queue, said third flag associated with said entered interrupt bit number in said interrupt detection circuitry is cleared.

8. The bridge device as recited in claim 7, wherein, when said interrupt message generator posts a message signaled interrupt, the second flag associated with said posted interrupt bit number in said interrupt detection circuitry is cleared.

9. The bridge device as recited in claim 1, wherein said bridge device, secondary bus devices, and primary bus device are PCI devices and wherein said first and second buses are PCI buses.

10. The bridge device as recited in claim 9, wherein one or more of said bridge device, secondary bus devices, and primary bus device are PCI-X devices and wherein one or more of said first and second buses are PCI-X buses.

11. A PCI bridge device for generating message signaled interrupts to indicate completion of write transactions from one or more secondary PCI bus devices to a primary PCI bus device, said bridge device being coupled between a primary PCI bus and a secondary PCI bus, said one or more secondary PCI bus devices being coupled to said secondary PCI bus and said primary PCI bus device being coupled to said primary PCI bus, the bridge device comprising:

a bridge FIFO and control circuitry for controlling data transfer between said one or more secondary PCI bus devices and said primary PCI bus device, said bridge FIFO and control circuitry being configured to store and transfer write data from said one or more secondary PCI bus devices to said primary PCI bus device;

a first register for storing a set of interrupt bit numbers, wherein each of said one or more secondary PCI bus devices is configured to write an interrupt bit number into said first register after completion of a write data transfer to said bridge FIFO and control circuitry to indicate completion of said write data transfer; and an interrupt generation logic coupled to said bridge FIFO and control circuitry and said first register for generating message signaled interrupts in response to said writing of said interrupt bit numbers, wherein said interrupt generation logic generates said message signaled interrupts in the order said write data transfers are posted to said primary PCI bus, said interrupt generation logic further includes a circular queue for tacking said interrupt bit numbers to maintain the generation of message signaled interrupts in order relative to write data transfers posted to said primary bus, and wherein each of said message signaled interrupts is generated and posted after all write data transfers associated with said interrupt bit number have been posted to said primary PCI bus.

12. The PCI bridge device as recited in claim 11, wherein said interrupt generation logic generates said message signaled interrupts as write transactions.

13. The PCI bridge device as recited in claim 11, wherein said interrupt generation logic further comprises:

an interrupt detection circuitry arranged to detect said writing of said interrupt bit numbers in said first register;

a posted write tracking circuitry arranged to track posting of said write data transfers to said primary PCI bus;

a set of posted write registers coupled between said posted write tracking circuitry and said interrupt detection circuitry with one posted write register being provided for each of the interrupt bit numbers in said first register, each of said posted write registers being arranged to store the number of outstanding write data transfers that have not been posted to said primary PCI bus;

the circular queue for sequentially storing said interrupt bit numbers in the order written from said one or more secondary PCI bus devices, wherein said circular queue is arranged to output said interrupt bit numbers sequentially in the order said write data transfers are posted to said primary PCI bus;

an interrupt entry logic circuitry arranged to sequentially enter said interrupt bit numbers from said interrupt generation logic into said circular queue in the order written from said one or more secondary PCI bus devices; and an interrupt message generator arranged to generate and post said message signaled interrupts in response to said output interrupt bit numbers from said circular queue.

14. The PCI bridge device as recited in claim 13, wherein said interrupt detection circuitry includes:

a second register for storing a set of first flags with one first flag for each of the interrupt bits in said first register, each first flag indicating whether an associated interrupt bit number is pending in said circular queue; and a third register for storing a set of second flags with one second flag for each of the interrupt bits in said first register, each second flag indicating whether an associated interrupt bit needs to be queued in said circular queue.

15. The PCI bridge device as recited in claim 14, wherein said circular queue includes:
   a set of circularly linked fourth registers for storing said interrupt bit numbers with one fourth register being provided for each of said interrupt bit numbers;
   an incoming interrupt pointer arranged to point to one of the fourth registers to indicate where an incoming interrupt bit number from said interrupt entry logic circuitry is to be stored; and
   a current interrupt pointer arranged to point to one of the fourth registers to indicate an interrupt bit number to be provided to said interrupt message generator.

16. The PCI bridge devices as recited in claim 15, wherein any posted write registers that have a non-zero value is decremented by one when a write data transfer has been posted to said primary PCI bus.

17. The PCI bridge device as recited in claim 16, wherein, when said interrupt entry logic circuitry enters an interrupt bit number into said circular queue, said third flag associated with said entered interrupt bit number in said interrupt detection circuitry is cleared.

18. The PCI bridge device as recited in claim 17, wherein, when said interrupt message generator posts a message signaled interrupt, the second flag associated with said posted interrupt bit number in said interrupt detection circuitry is cleared.

19. The bridge device as recited in claim 11, wherein one or more of said secondary bus devices and primary bus device are PCI-X devices and wherein one or more of said first and second buses are PCI-X buses.

20. A method for generating message signaled interrupts to indicate completion of write transactions from one or more secondary bus devices to a primary bus device, said primary bus device being coupled to a first bus and said one or more secondary bus devices being coupled to a second bus, the method comprising:
   receiving and storing write data from said one or more secondary bus devices for transfer to said primary bus device over said first bus;
   receiving and storing a set of interrupt bit numbers in a first register, wherein each of said one or more secondary bus devices is configured to write an interrupt bit number into said first register after completion of a write data transfer to indicate completion of said write data transfer; and
   generating message signaled interrupts in response to said writing of said interrupt bit numbers, wherein said message signaled interrupts are generated and posted in the order said write data transfers are posted to said first bus, and said interrupt bit numbers are circularly queued to maintain the generation of message signaled interrupts in order relative to write data transfers being posted to said first bus, and wherein each of said message signaled interrupts is generated and posted after all write data transfers associated with said interrupt bit number have been posted to said first bus.

21. The method as recited in claim 20, wherein said message signaled interrupts are posted to said first bus as write transactions.

22. The method as recited in claim 20, wherein the operation of generating said message signaled interrupts further comprises:
   detecting said writing of said interrupt bit numbers in said first register;
   tracking posting of said write data transfers to said first bus;
   storing the number of outstanding write data transfers that have not been posted to said first bus in a set of posted write registers, wherein one posted write register is provided for each of the interrupt bit numbers in said first register;
   sequentially storing said interrupt bit numbers in a circular queue in the order written from said one or more secondary bus devices, wherein said circular queue is arranged to output said interrupt bit numbers sequentially in the order said write data transfers are posted to said first bus;
   sequentially entering said interrupt bit numbers from said interrupt generation logic into said circular queue in the order written from said one or more secondary bus devices; and
   generating and posting said message signaled interrupts in response to said output interrupt bit numbers from said circular queue.

23. The method as recited in claim 22, wherein the operation of detecting said writing of said interrupt bit numbers includes:
   storing a set of first flags in a second register with one first flag for each of the interrupt bits in said first register, each first flag indicating whether an associated interrupt bit number is pending; and
   storing a set of second flags in a third register with one second flag for each of the interrupt bits in said first register, each second flag indicating whether an associated interrupt bit needs to be queued in said circular queue.

24. The method as recited in claim 23, wherein said circular queue includes:
   a set of circularly linked fourth registers for storing said interrupt bit numbers with one fourth register being provided for each of said interrupt bit numbers;
   an incoming interrupt pointer arranged to point to one of the fourth registers to indicate where an incoming interrupt bit number from said interrupt entry logic circuitry is to be stored; and
   a current interrupt pointer arranged to point to one of the fourth registers to indicate an interrupt bit number to be provided to said interrupt message generator.

25. The method as recited in claim 24, wherein any posted write registers that have a non-zero value is decremented by one when a write data transfer has been posted to said first bus.

26. The method as recited in claim 25, wherein, when an interrupt bit number is entered into said circular queue, said third flag associated with said entered interrupt bit number in said interrupt detection circuitry is cleared.

27. The method as recited in claim 26, wherein, when a message signaled interrupt is posted to said first bus, the second flag associated with said posted interrupt bit number in said interrupt detection circuitry is cleared.

28. The method as recited in claim 20, wherein said secondary bus devices and primary bus device are PCI devices and wherein said first and second buses are PCI buses.

29. The method as recited in claim 28, wherein one or more of said secondary bus devices and primary bus device are PCI-X devices and wherein one or more of said first and second buses are PCI-X buses.

* * * * *